United States Patent
Ergang et al.

(10) Patent No.: US 10,676,376 B2
(45) Date of Patent: Jun. 9, 2020

(54) MODIFICATION OF IRON-BASED MEDIA FOR WATER TREATMENT

(71) Applicant: ECOLAB USA INC., St. Paul, MN (US)

(72) Inventors: Nicholas S. Ergang, Glen Ellyn, IL (US); Daniel E. Schwarz, Naperville, IL (US); Darlington Mlambo, Oswego, IL (US); Bruce A. Keiser, Plainfield, IL (US); Hung Ting Chen, Aurora, IL (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 15/703,028

(22) Filed: Sep. 13, 2017

(65) Prior Publication Data
US 2018/0086650 A1   Mar. 29, 2018

Related U.S. Application Data

(60) Provisional application No. 62/401,486, filed on Sep. 29, 2016.

(51) Int. Cl.
*C02F 1/42* (2006.01)
*B01J 20/02* (2006.01)
(Continued)

(52) U.S. Cl.
CPC ............. *C02F 1/42* (2013.01); *B01J 20/0229* (2013.01); *B01J 20/0237* (2013.01);
(Continued)

(58) Field of Classification Search
None
See application file for complete search history.

(56) References Cited

U.S. PATENT DOCUMENTS

| | | | |
|---|---|---|---|
| 4,405,464 A | | 9/1983 | Baldwin et al. |
| 5,580,770 A | * | 12/1996 | DeFilippi .................. C02F 3/06 210/615 |

(Continued)

FOREIGN PATENT DOCUMENTS

| | | |
|---|---|---|
| CN | 101244864 B | 9/2010 |
| CN | 102718544 A | 10/2012 |

(Continued)

OTHER PUBLICATIONS

Wang et al., "Synthesizing Nanoscale Iron Particles for Rapid and Complete Dechlorination of TCE and PCB," Env. Sci. & Techn., vol. 31 No. 7, pp. 2154-2156 (1997).*

(Continued)

*Primary Examiner* — Chester T Barry
(74) *Attorney, Agent, or Firm* — Eric D. Babych; Barnes & Thornburg LLP

(57) ABSTRACT

Methods of modification of zero-valent iron (ZVI) to improve its performance in removing contaminants from a discharge stream. In some aspects, the methods include contacting ZVI-impregnated disks with solutions containing metal cations such as $Ni^{2+}$, $Cu^{2+}$, $Fe^{2+}$, or $Pd^{2+}$. In some aspects, a wastewater stream is treated with a metal cation solution, then passed over ZVI. Compositions for treating wastewater include ZVI that is modified with a metal cation solution.

5 Claims, 4 Drawing Sheets

(51) Int. Cl.
*C02F 1/28* (2006.01)
*C02F 1/70* (2006.01)
*C02F 101/10* (2006.01)
*C02F 101/16* (2006.01)
*C02F 101/20* (2006.01)

(52) U.S. Cl.
CPC .............. *C02F 1/281* (2013.01); *C02F 1/705* (2013.01); *C02F 2001/425* (2013.01); *C02F 2101/103* (2013.01); *C02F 2101/106* (2013.01); *C02F 2101/163* (2013.01); *C02F 2101/20* (2013.01)

(56) References Cited

U.S. PATENT DOCUMENTS

| | | | |
|---|---|---|---|
| 7,008,964 B2 | 3/2006 | Clausen et al. | |
| 8,097,559 B2 | 1/2012 | Noland et al. | |
| 8,101,087 B2 | 1/2012 | Kane et al. | |
| 8,668,831 B2 * | 3/2014 | Sawyer | B01J 20/0229 210/502.1 |
| 2003/0196961 A1 | 10/2003 | Santina | |
| 2004/0133059 A1 * | 7/2004 | Scalzi | B09C 1/08 588/316 |
| 2006/0175266 A1 * | 8/2006 | Rima | C02F 1/725 210/764 |
| 2006/0249465 A1 * | 11/2006 | Jin | A61L 9/16 210/764 |
| 2010/0230350 A1 * | 9/2010 | Etou | C02F 1/66 210/633 |
| 2011/0174743 A1 * | 7/2011 | Huang | C02F 1/705 210/758 |
| 2012/0273431 A1 | 11/2012 | Huang | |
| 2014/0069872 A1 | 3/2014 | Huang | |
| 2014/0263068 A1 * | 9/2014 | Sherwood | C02F 1/281 210/660 |
| 2015/0001155 A1 | 1/2015 | Johnson | |
| 2015/0001157 A1 * | 1/2015 | Johnson | C02F 1/42 210/688 |
| 2015/0076072 A1 * | 3/2015 | Chang | C02F 1/42 210/684 |
| 2016/0023921 A1 | 1/2016 | Addiego et al. | |
| 2016/0052800 A1 | 2/2016 | Dong | |
| 2016/0052808 A1 | 2/2016 | Huang | |
| 2016/0145134 A1 | 5/2016 | Simmons | |
| 2017/0320763 A1 * | 11/2017 | Noland | C02F 3/346 |
| 2017/0334755 A1 * | 11/2017 | Yan | B09C 1/00 |
| 2018/0111855 A1 * | 4/2018 | Huang | C02F 1/281 |

FOREIGN PATENT DOCUMENTS

| | | | |
|---|---|---|---|
| CN | 102807272 A | | 12/2012 |
| CN | 102951749 A | | 3/2013 |
| CN | 103112918 A | | 5/2013 |
| CN | 103787484 A | | 5/2014 |
| CN | 104192976 A | | 12/2014 |
| CN | 104276646 A | | 1/2015 |
| CN | 105174414 A | | 12/2015 |
| CN | 105198067 A | | 12/2015 |
| CN | 105253983 A | | 1/2016 |
| CN | 105645551 A | | 6/2016 |
| JP | 09-187778 | * | 7/1997 |
| JP | 2006-346618 | * | 12/2006 |
| KR | 1076765 B1 | * | 10/2011 |
| WO | WO 2016/065015 A1 | | 4/2016 |

OTHER PUBLICATIONS

Yoo et al., "Electrochemically fabricated zero-valent iron, iron-nickel, and iron-palladium nanowires for environmental remediation applications," Wat. Sci. & Techn., vol. 55 No. 1-2 pp. 149-156 (2007).*

JP 2006-346618 machine translation (2018).*

Sukopová, Martina, et al., "Application of Iron Nanoparticles for Industrial Wastewater Treatment," NANOCON 2013—Conference Proceedings, 5th International Conference, pp. 456-460 (2013).

Li, Hai-jun, et al., "Trichloroethylene dechlorination by copper-contained zero-valent iron slurry," *Chemical Research in Chinese Universities*, 29(6):1173-1179, Abstract only (Dec. 2013).

O'Carroll, Denis, et al., "Nanoscale zero valent iron and bimetallic particles for contaminated site remediation," *Advances in Water Resources*, 51:104-122 (Jan. 2013).

Crane, R.A., et al., "Nanoscale zero-valent iron: Future prospects for an emerging water treatment technology," *J. Haz. Mater.*, 211-212:112-125 (2012).

Huang, "Pilot-scale demonstration of the hybrid zero-valent iron process for treating flue-gas desulfurization wastewater," *Water Science & Technology*, IWA Publishing 67.1, pp. 16-23 (2013).

Mondal, Kanchan, et al., "Removal of Selenate by Fe and NiFe Nanosized Particles," *Ind. Eng. Chem. Res.*, 43(16):4922-4934, Abstract only (2004).

Ryu, et al., "Reduction of highly concentrated nitrate using nanoscale zero-valent iron: Effects of aggregation and catalyst on reactivity," *App. Cat. B: Environmental* 105:128-135 (2011).

\* cited by examiner

US 10,676,376 B2

MODIFICATION OF IRON-BASED MEDIA FOR WATER TREATMENT

FIELD

The present disclosure relates to methods and compositions for treating wastewater. More specifically, the disclosure is directed to methods of improving the performance of zero-valent iron (ZVI) by treating ZVI with solutions containing metal cations.

BACKGROUND

Wastewater produced by mining, refining, paper manufacturing, power generation, and other industrial processes frequently contains high levels of contaminants like selenium, arsenic, mercury, and nitrates. Government-mandated standards regulating allowable release are becoming increasingly stringent, but traditional physical chemistry methods may not be able to achieve these new limits. Industry needs more effective ways to reduce these contaminants to meet the new standards.

ZVI has recently been used to remove selenium from discharge water. However, ZVI suffers from slow reaction kinetics, poisoning from other contaminants, and particle agglomeration over time. While ZVI is capable of reducing the oxidation state of Se and removing it from solution, the technology has not yet seen widespread adoption. Significant research has also been done in nanoZVI, doping, and related technologies in an effort to mitigate these issues.

SUMMARY

In one aspect, methods are disclosed for treating a wastewater stream, including contacting ZVI with a metal cation solution to form a modified ZVI; and contacting a wastewater stream with the modified ZVI. The metal cation may be one or more of ferrous iron, nickel, copper, and palladium. The modified ZVI is effective for removal of selenium, arsenic, mercury, and/or nitrates from the wastewater stream.

In some embodiments, the ZVI is bound to a solid support, which may be reticulated foam, for example. In some embodiments, the ZVI is a particulate ZVI not bound to a solid support.

In one aspect, methods are disclosed for treating ZVI, including contacting ZVI with a metal cation solution containing one or more of ferrous iron, nickel, copper, and palladium to form a modified ZVI. In some embodiments, the modified ZVI is then coated onto a substrate. The substrate may be a solid support, for example, reticulated foam.

In one aspect, methods are disclosed for treating a wastewater stream, including contacting the wastewater stream with a solution containing one or more metal cations selected from ferrous iron, nickel, copper, and palladium to form a treated wastewater stream; and contacting a ZVI with the treated wastewater stream.

In some embodiments, the ZVI is bound to a solid support constructed from a material selected from ceramics, metals, polyethers, polyurethane, polyester, activated carbon, activated alumina, clays, and silica-based materials.

In some embodiments, the concentration of metal cations used to modify the ZVI is about 1 to about 500 ppm. In a preferred embodiment, the concentration of metal cations is about 20 to about 100 ppm.

In some embodiments, the pH of a wastewater stream is maintained at a pH of about 3 to about 7 at the time of contact with the ZVI. In a preferred embodiment, the pH of the wastewater stream is maintained at about pH 6.0 at the time of contact with the ZVI.

Treatment of ZVI according to embodiments disclosed herein has been shown to improve the performance of the ZVI at removing contaminants from a wastewater stream.

BRIEF DESCRIPTION OF THE DRAWINGS

Various embodiments are described with reference to the following drawings. These drawings are provided for illustration purposes only and should not be construed to limit the scope of the claimed invention. The person of skill in the art will understand that modifications, additions, and alternative embodiments may exist within the scope and spirit of the present disclosure, but which are not necessarily specifically identified by the foregoing drawings.

DETAILED DESCRIPTION

Figure 1:
FIG. 1 is a process diagram showing Se/As treatment in wastewater from a power plant.

The present disclosure is directed to technologies for removal of chemical contaminants such as Hg, Se, As, and $NO_3$ from discharge water. These contaminants can be at least partially removed or neutralized by reaction with zero valent iron ($Fe°$, or ZVI).

U.S. Pat. No. 8,668,831, the contents of which are incorporated in their entirety by reference herein, describes the commercial use of ZVI glued (adhered) to a reticulated foam substrate to remove selenate from an aqueous solution with typical sulfate and nitrate concentrations. Selenate removal from wastewater is extremely difficult due to the inert nature, high solubility, and low concentration of the oxoanion.

The reticulated foam can be formed of polyurethane or polyether and incorporates ZVI particles for removal of contaminants from an aqueous solution. The reticulated foam maintains high permeability over the life of the ZVI as it reacts with impurities and decontaminates the water. ZVI foam disks are reported to remove selenium in a stream of selenium-laden water according to first order kinetics and with a half-life of about 12 minutes. The polishing step generally requires a solid/liquid separation step prior to treatment with ZVI, because total suspended solids (TSS) have been shown to decrease performance in the system.

As used herein, the term "polishing" means steps of wastewater treatment that follow more traditional methods of removing contaminants, such as phase separation, sedimentation, filtration and oxidation. Polishing may involve secondary treatment steps like pH adjustment, reduction, or carbon filtering.

To maximize surface area, ZVI has also been used in a powder form. The smaller particles in ZVI powders are more reactive than the generally larger particles bound to a solid support. Unfortunately, the powders quickly agglomerate, reducing both the available surface area and the ability of water to flow through the ZVI particles. Ribbons of ZVI have also been used, such as iron wool, but the surface area is not maximized and the flow path is quickly diminished. Thus, commercial development of the technology into an active treatment component has been difficult.

Synthesis of metal-doped and bimetallic ZVI-based particles have also been described in the art. Ni-doped ZVI has been shown to improve the performance of ZVI. The kinetics of the reaction are also not well understood, particularly with the variations in water chemistry that are typical in waste water treatment plants.

One goal of the instant disclosure is to improve the performance of ZVI when used as a solid support. Another goal is to use ZVI to treat wastewater, without the need for a solid support, and without some of the limitations of prior methods. It has surprisingly been found that treatment of ZVI media with a metal cation (e.g., Ni) solution improves the efficacy of the ZVI material for removal of contaminants, including selenium and nitrates, from a wastewater stream, as compared to prior methods.

Thus, in one aspect, methods are described for treating wastewater using ZVI.

In one embodiment, a method for treating wastewater includes contacting ZVI with a metal cation solution to form treated ZVI, then contacting the wastewater with the treated ZVI.

In some embodiments, the ZVI is bound to a solid support. In certain embodiments, the solid support is a reticulated foam. The solid support may be constructed from a material selected from ceramics, metals, polyethers, polyurethane and polyester.

Treatment of commercial ZVI with a cationic metal solution to improve the subsequent performance of the ZVI at removing contaminants from wastewater is not limited to treating the ZVI bound to a solid support. Thus, in some embodiments, the ZVI is a particulate ZVI not bound to a solid support. Commercial grade ZVI powder is generally available.

In embodiments, the metal cation is ferrous iron, nickel, copper, or palladium. In a preferred embodiment, the metal cation is nickel.

In embodiments, the treated ZVI solution is effective for removal of selenium, arsenic, transition metals (e.g., mercury, copper, nickel), and/or oxoanions (e.g., nitrates, selenates, arsenates, arsenites) from a wastewater stream.

Thus, in a particular embodiment, a method for treating a wastewater stream includes contacting ZVI with a nickel solution to form treated ZVI; and contacting a wastewater stream with the treated ZVI, wherein the treated ZVI solution is effective for removal of selenium, arsenic, transition metals (e.g., mercury), and/or oxoanions (e.g., nitrates, selenates, arsenates, arsenites) from the wastewater stream.

Methods for contacting the ZVI with a metal cation solution include modification of the ZVI material by contact with metal cations prior to operation; a drip-in metal cation feed into the wastewater stream prior to exposure of the wastewater stream to the ZVI material; or a pre-treatment of the ZVI material during the manufacturing process. For example, ZVI may first be adhered to reticulated foam discs (pucks), then modified (i.e., "activated") using the metal cation solutions, as described herein.

As used herein, the term "sorbent" may refer to a material used to collect another substance by sorption, by the process of absorption (assimilation of molecules throughout a solid or liquid absorbent), adsorption (attracting molecules to the surface of an adsorbent), or both.

In some cases, the term "treated" or "treatment"—when referring to contact of ZVI to a metal cation solution—may be used interchangeably with the term "modified." For example, a "metal cation-treated ZVI" may also be referred to herein as a "metal cation-modified ZVI."

Modification of ZVI—whether bound or particulate—with a metal cation solution, as outlined herein, appears to activate the ZVI, making the modified ZVI more effective at removing contaminants such as selenium, arsenic and/or nitrates from a wastewater stream. Thus, modified ZVI may alternatively be referred to as "active ZVI" or "activated ZVI" herein.

The term "wastewater" or "wastewater stream" is understood to refer to any generally aqueous runoff produced by manufacturing or refining processes as described herein, and which are generally understood to require treatment to remove potentially dangerous contaminants. The terms "discharge stream", "runoff", and "runoff stream" may be used interchangeably, as understood by a person of skill in the art.

Wastewater streams, once treated to remove selenium and other contaminants, may subsequently be recycled back to a reactor or released to the environment once compliant.

In one aspect, methods are disclosed for modification of commercial ZVI that improve the performance of the ZVI.

In some embodiments, a method of modification of ZVI involves contacting ZVI impregnated disks with solutions containing metal cations such as Fe2+, Ni2+, Cu2+, Pd2+. In some embodiments, methods for modifying ZVI include contacting particulate ZVI with solutions containing metal cations such as $Fe^{2+}$, $Ni^{2+}$, $Cu^{2+}$, and $Pd^{2+}$. In certain of these embodiments, the particulate ZVI is not bound or otherwise associated with any solid support.

One goal of wastewater treatment is to identify, develop, and commercialize technologies for metal cation and oxoanion removal from power plant wastewater. These can include species containing Hg, Se, As, $NO_3$, etc. The applicants' Se removal technology from commercially-available ZVI-based media is part of a comprehensive end-of-pipe solution including solid/liquid separation technologies and filtration.

FIG. 1 is a power plant process diagram illustrating the end-of-pipe technologies described herein, emphasizing the steps associated with the polishing treatment steps for removal of contaminants such as Se from a wastewater stream.

Referring to FIG. 1, primary and secondary treatment of wastewater removes a significant amount of contaminants, but may leave selenate and other contaminants in the wastewater stream. Primary treatment may involve, for example, use of microalgae or treatment with a polymeric technology (e.g., Nalmet® or related technology) to remove mercury and other heavy metals. Secondary treatment may involve, for example, one or more precipitation steps. A solid/liquid separation filtration step removes as much of the remaining TSS (total suspended solids) as possible, to minimize interference of these solids with subsequent polishing treatment. As provided herein, this last step is also effective at removing nitrates and other contaminants remaining in the wastewater stream from earlier stages of processing.

Without wishing to be bound to any particular theory, metal cations such as Ni', when added to ZVI, may activate the ZVI by acting indirectly as catalysts to speed electron transfer and the redox reactions involved at the ZVI interface with the wastewater solution. The mechanism by which this activation is achieved is not fully understood, but can perhaps best be explained in terms of the relative redox potential of the participating metals. Elemental iron is an excellent reducing agent, explaining its widespread use as a groundwater remediator of organic compounds and various metal cations.

ZVI chemically reduces target contaminants such as selenium, arsenic, and nitrates and other oxoanions (e.g., selenates, chromates), mercury and other transition metals, promoting precipitation and removal.

Adding metal cations to ZVI improves the overall performance of the ZVI for contaminant removal, regardless of the initial form of the ZVI. Use of a substrate may still be beneficial in some cases, but is not required.

ZVI thus reduces the Ni in solution at the surface of the ZVI particles (bound or unbound) to form a Fe—Ni complex. This complex on the surface of the ZVI particles appears to promote electron transfer, and leads to the reduction of the contaminants in solution which releases some of the ZVI as oxidized iron ($Fe^{2+}$ or $Fe^{3+}$) and consequentially some of the nickel as $Ni^{2+}$. This small amount of oxidized ZVI enters the wastewater stream in the ionized ferric or ferrous form. This oxidized iron will also eventually precipitate, requiring an additional solid/liquid separation step to remove the precipitated iron after the polishing step. See FIG. 1.

Despite this loss of a small amount of oxidized iron, treatment of the ZVI using metal cations significantly improves the performance of the (remaining) ZVI. This may be attributed to an improved electron transport capacity associated with the treated ZVI particles. Oxidation of the ZVI in water likely forms a mixed metal oxide ($Fe^{2+}$, $Fe^{3+}$) coating on the surface of the ZVI particles, especially $Fe_3O_4$, with improved electron transfer properties. Thus, adding a metal cation such as nickel to ZVI may lead to iron species with improved electron transfer, act catalytically, or act by other mechanisms to improve subsequent performance of the ZVI.

Levels of metal cations such as $Ni^{2+}$, $Cu^{2+}$, and $Pd^{2+}$ in a wastewater stream are generally extremely low, on the order of parts per billion. In some embodiments using the methods disclosed herein, one or more of these metal cations is added to a wastewater stream in concentrations ranging from about 1 to about 500 ppm, preferably about 20 to about 100 ppm, more preferably about 10 to about 50 ppm.

Thus, in one embodiment, treatment of a wastewater stream includes adding one or more metal cations to the wastewater stream following an initial solid/liquid separation, and prior to the polishing treatment step, to modify ZVI used in the polishing treatment. See FIG. 1.

In a particular embodiment, a method for treating a wastewater stream is disclosed, including contacting the wastewater stream with a solution containing one or more metal cations selected from the group consisting of ferrous iron, nickel, copper, and palladium to form a treated wastewater stream; and contacting a ZVI with the treated wastewater stream.

Various forms of ZVI and methods of modifying the ZVI may be employed.

In some embodiments, modification of ZVI pucks includes (pre)soaking the ZVI pucks in solutions having approximately 1000 ppm $Ni^{2+}$. These relatively high levels of Ni appear to modify the ZVI, activating the ZVI for subsequent capture of contaminants such as selenium, without a significant amount of the Ni itself being "captured" by the ZVI.

In some embodiments, a particulate (e.g. powder) form of ZVI is first modified with a metal cation solution, as described herein, and the modified particulate ZVI is subsequently inserted or attached to another sorbent material. Suitable sorbent materials for this purpose include activated carbon, activated alumina, clays, and silica-based materials.

Alternatively, the particulate modified ZVI may be coated onto a second substrate.

The binding and activity of metal cations in relation to ZVI may be significantly affected by changes in pH. In some embodiments, the pH of a solution containing metal cations is maintained at a pH of about 3 to about 7 at the time of contact with the ZVI. In a preferred embodiment, pH of a solution containing metal cations is maintained at about 6.0 at the time of contact with ZVI, to encourage interactions between the metal cation(s) and the ZVI which activate the ZVI.

In another aspect, compositions for treating wastewater are disclosed, wherein the compositions include ZVI. In one embodiment, a composition for treating wastewater includes ZVI that has been modified with a metal cation solution containing one or more of ferrous iron, nickel, copper, and palladium. The ZVI may be at least partially oxidized and may include iron as $Fe_3O_4$. Oxidized ZVI may form a coat over the ZVI particles. In some embodiments, the nickel-treated ZVI is not bound to a solid support. In some embodiment, the nickel-treated ZVI is bound to a solid support.

The methods and compositions disclosed herein have widespread application in treating wastewater streams associated with mining, paper manufacturing, refining, groundwater remediation sites, and power generation (e.g., coal-fired power plants). In addition, the methods and compositions disclosed herein have applications for treatment of other (non-aqueous) wastestreams, such as wastestreams containing substantial amounts of oil or other hydrocarbons (e.g., oil spills).

For example, there is a great need for more effective ways to remove Se and As from runoff water produced in mining operations. The disclosed methods may be used as a polishing step for Se and As removal from any clarified water source. Se permits are being lowered and refineries need a way to polish out the Se to meet them as traditional physical chemistry will not be able to achieve the lowered limits. As an example, depending on the industry and jurisdiction, the limits for Se may be 5-25 ppb Se in a wastewater stream, determined on a monthly basis.

Oil refinery water streams contain other oxyanions that may be removed with this enhancement. These improvements may also enable enhanced removal of other oxyanions beyond Se and As compounds. Selenium removal from the wastestreams of selenium-doped foodstuffs, such as selenium enriched yeast, is also important.

The methods and compositions described herein are suitable for small and large scale operations, with field applications possible for treating several thousand gallons of wastewater per minute.

Example

The following non-limiting example is provided to further illustrate the invention. The person of skill in the art will understand that variations, additions, substitutions, and deletions involving specific parameters may be made hereto and that additional illustrative examples are possible, all within the scope of the invention.

The performance of metal-modified ZVI reticulated foam discs (i.e., sorbent pucks) was evaluated in multiple waters for removal of selenium and arsenic. Multiple columns containing ZVI sorbent pucks were constructed and used. These experiments thus looked at modified and unmodified ZVI on solid supports, using contact time as an independent variable.

Performance testing was conducted by slowly pumping wastewater solution (synthetic or real) through columns packed with a treated reticulated foam substrate. Flow rates and the amount of substrate were varied to achieve different contact times. See FIG. 2. Samples were taken at regular intervals and analyzed. All water analyses were conducted by the Nalco Water Lab, including 0.45 um filtered ICP analysis, IC, Se, and As testing.

Figure 2:
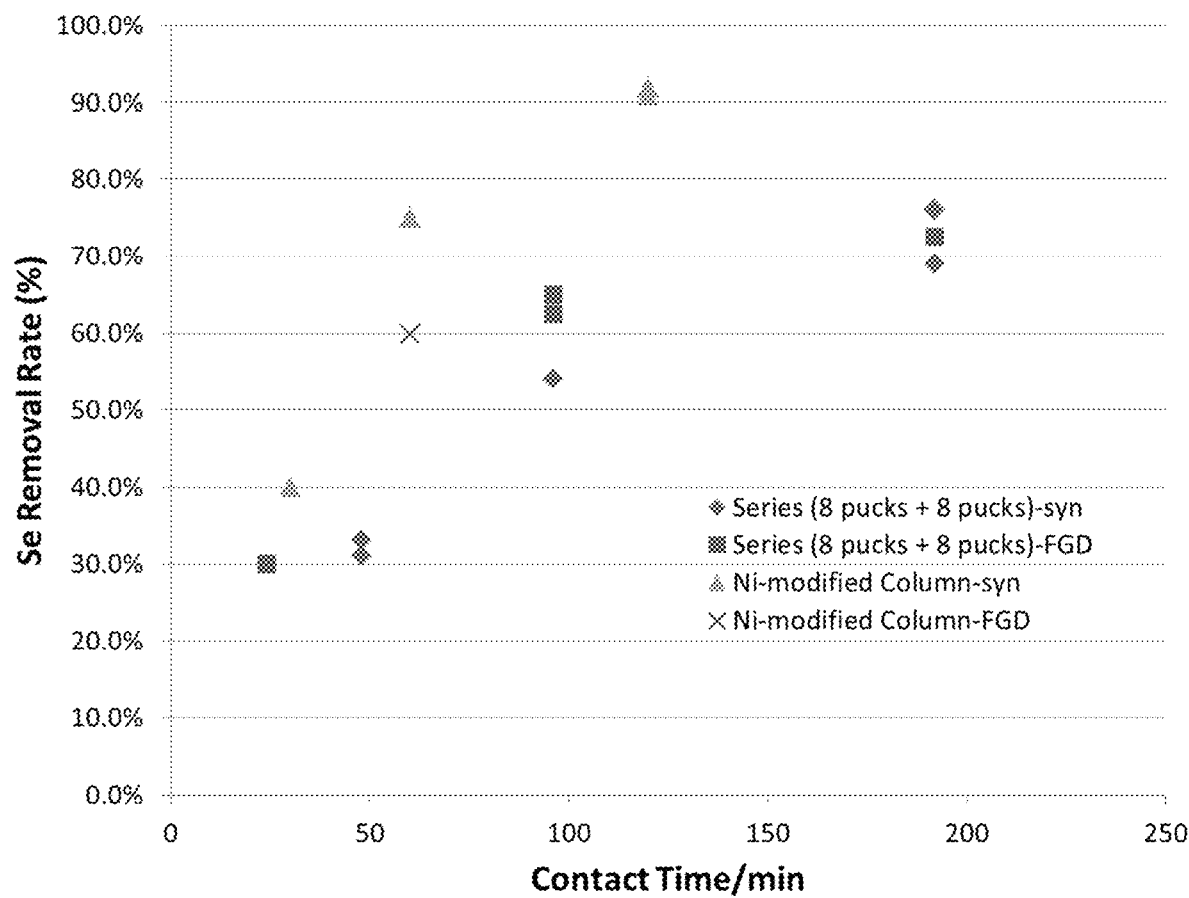
FIG. 2 is a graph illustrating Se removal rate vs. ZVI contact time using synthetic water and FGD water.

FIG. 2 illustrates selenium removal rate, by measuring selenium concentration relative to its original concentration in solution (i.e., %), as a function of contact time (min) of the wastewater stream with ZVI on a reticulated foam substrate.

Multiple columns were used, each packed with commercially-available reticulated foam discs (pucks). Different flow rates of the same solution were run through each column, with effluent samples analyzed as described. Estimated contact time was determined based on the volume of each column, flow rate, and the number of pucks used in each column. In Series (8 pucks+8 pucks)-syn, synthetic wastewater was run through Column A with 8 pucks and Column B with 8 pucks, arranged in series. Column A and Column B were not treated with nickel or any other metal cation. In Series (8 pucks+8 pucks)-FGD (flue-gas desulfurization) wastewater (i.e., actual wastewater) was run through Column A with 8 pucks and Column B with 8 pucks arranged in series. A separate column was packed with ten ZVI pucks. A nickel solution was poured into the column to soak overnight and to modify (activate) the bound ZVI. Either synthetic wastewater (Ni-modified Column-syn) or FGD wastewater (Ni-modified Column-FGD) was run through this column in separate trials.

Synthetic wastewater was produced using either tap water or deionized water, adding gypsum to saturation to obtain a standard concentration of calcium and sulfate. Selenium was generally added at a concentration of 1 ppm as selenate. Arsenic was generally added at a concentration of 1 ppm as arsenate. Nitrate was also added at a concentration of 10-20 ppm as sodium nitrate.

The removal rate of the unmodified ZVI sorbent is relatively slow. As shown in FIG. 2, even when the sorbent was set up in series in two columns with a relatively long contact time of 196 minutes, only about 70-75% of the selenate was removed. In contrast, treatment of the ZVI coated pucks with a $Ni^{2+}$ solution prior to exposure to contaminants resulted in much faster removal and higher removal rates. For example, about 75% of the selenate was removed after only about 60 minutes in the Ni-treated column, as shown in FIG. 2 ("Ni-modified Column-syn plot").

Measurements of selenium concentration were obtained using inductively coupled plasma atomic emission spectrometry (ICP-AES). Selenium in the wastewater streams was essentially all present as selenate.

Figure 3:
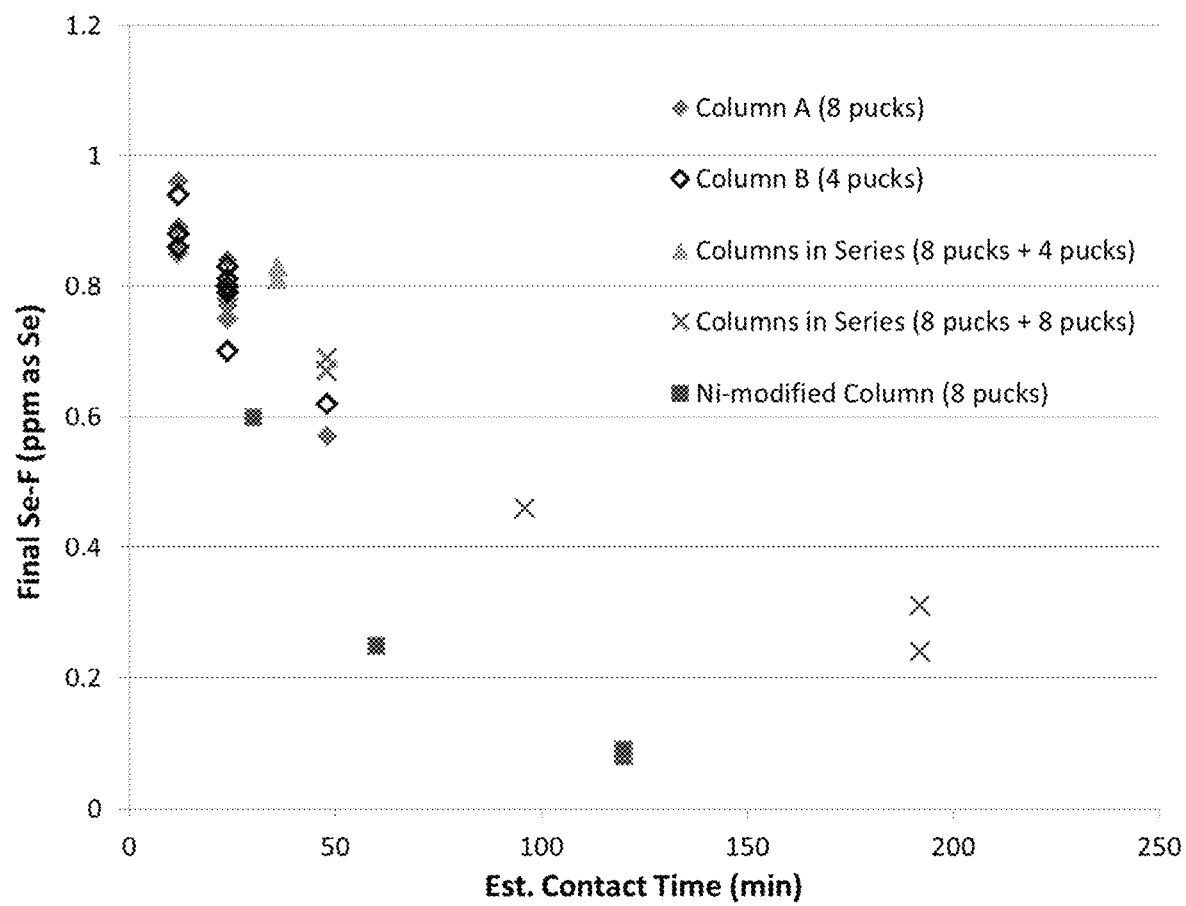
FIG. 3 is a graph illustrating final filtered Se (Se—F) concentrations vs. ZVI contact time in treated effluents.

FIG. 3 illustrates the absolute value of selenium (ppm as Se) as a function of contact time (min) of the wastewater stream with ZVI on a reticulated foam substrate. Column A contained four pucks and Column B contained 8 pucks. In the "Column A (8 pucks)" and "Column B (4 pucks)" trial shown in FIG. 3, synthetic wastewater was run through either Column A or Column B separately, with effluent collected and samples analyzed as described. In "Columns in Series (8 pucks+4 pucks)", synthetic wastewater was run through Column A with 4 pucks and Column B with 8 pucks, arranged in series. In "Columns in Series (8 pucks+8 pucks)", synthetic wastewater was run through Column A with 8 pucks and Column B with 8 pucks, arranged in series. In "Ni-modified Column", synthetic wastewater was run through a single column with 10 pucks previously treated with nickel as described. In this case, the effluent was first filtered before the selenium was measured.

As shown in FIGS. 2 and 3, addition of Ni to the ZVI resulted in significantly improved removal of the selenate at a much faster rate.

Figure 4:
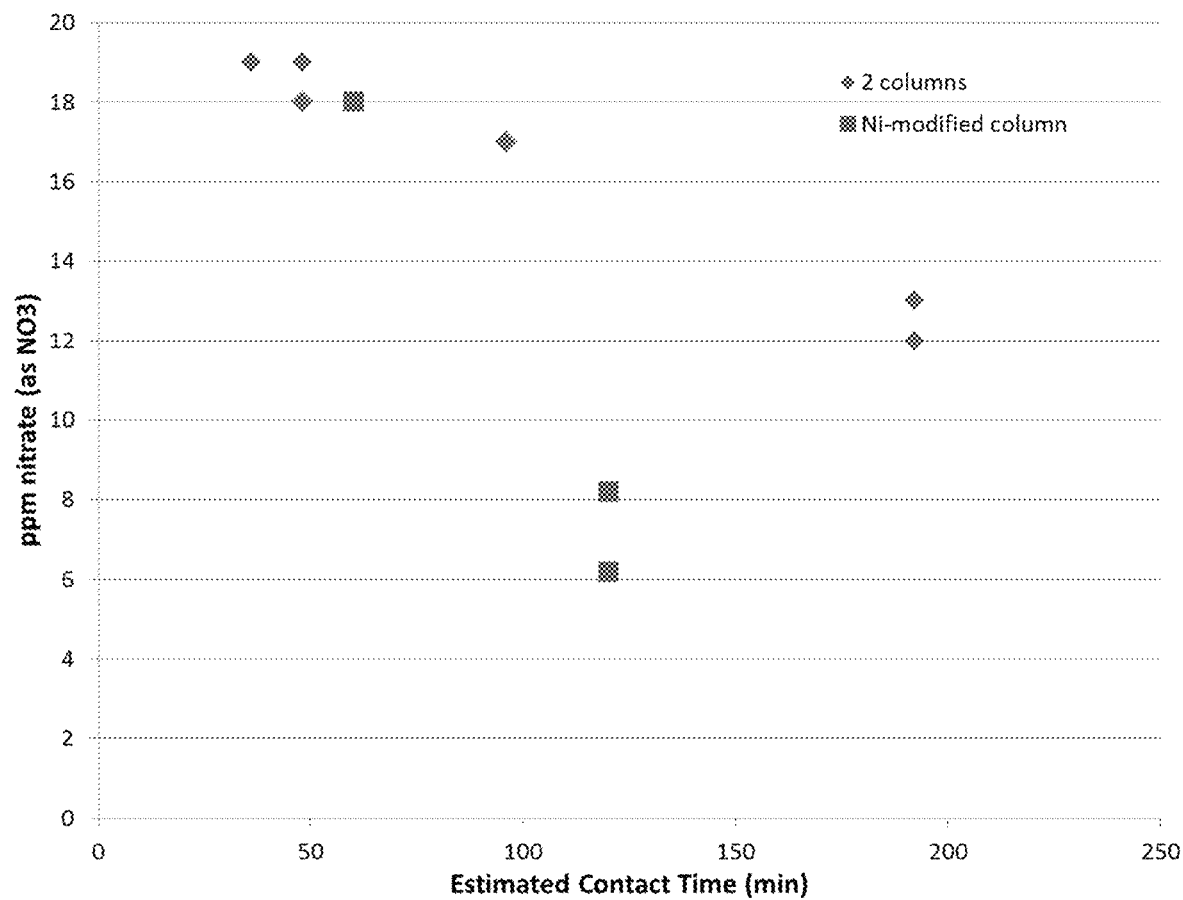
FIG. 4 is a graph illustrating final $NO_3$ concentrations vs. ZVI contact time in treated effluents.

FIG. 4 illustrates a similar experiment to FIG. 3, measuring instead the absolute value of nitrate (ppm as $NO_3$) as a function of contact time (min) in a wastewater stream with ZVI on a reticulated foam substrate. In "2 columns", synthetic wastewater was run through Column A with 8 pucks and Column B with 8 pucks, arranged in series. As previously described, neither Column A nor Column B were treated with nickel or any other metal cation prior to application of the wastewater stream. In "Ni-modified Column", synthetic wastewater was run through a single column with 10 pucks previously treated with nickel as described.

Nitrate exhibited a similar response to a nickel-treated ZVI (FIG. 4). As shown in FIG. 4, addition of Ni to the ZVI resulted in significantly improved removal of nitrates at a much faster rate.

Thus, treatment/modification of commercial ZVI with a metal cation solution (Ni, Pd, Cu, ferrous iron) improves the efficacy of the ZVI for selenium removal.

Although the present disclosure has been described with reference to preferred embodiments, people skilled in the art will recognize that changes may be made in form and detail without departing from the spirit and scope of the disclosure.

The invention claimed is:

1. A method for treating a wastewater stream, the method comprising:
   contacting the wastewater stream with a solution containing one or more metal cations selected from the group consisting of nickel and copper to form a treated wastewater stream;
   contacting a ZVI with the treated wastewater stream; and
   separating oxidized iron and a contaminant selected from selenium, arsenic, nitrates, and any combination thereof from the wastewater stream.

2. The method of claim 1, wherein the ZVI is bound to a solid support constructed from a material selected from ceramics, metals, polyethers, polyurethane, polyester, activated carbon, activated alumina, clays, and silica-based materials.

3. The method of claim 1, wherein the concentration of metal cations is about 1 to about 500 ppm.

4. The method of claim 1, wherein a pH of the wastewater stream is maintained at about 3 to about 7 at the time of contact with the ZVI.

5. The method of claim 4, wherein the pH of the wastewater stream is maintained at about pH 6.0 at the time of contact with the ZVI.

* * * * *